United States Patent
Yamamoto et al.

(10) Patent No.: US 7,453,289 B2
(45) Date of Patent: Nov. 18, 2008

(54) TRANSMISSION CIRCUIT, CMOS SEMICONDUCTOR DEVICE, AND DESIGN METHOD THEREOF

(75) Inventors: Kazuhiro Yamamoto, Tokyo (JP);
Toshiyuki Okayasu, Tokyo (JP)

(73) Assignee: Advantest Corporation, Tokyo (JP)

( * ) Notice: Subject to any disclaimer, the term of this patent is extended or adjusted under 35 U.S.C. 154(b) by 351 days.

(21) Appl. No.: 11/110,638

(22) Filed: Apr. 20, 2005

(65) Prior Publication Data
US 2005/0239431 A1 Oct. 27, 2005

Related U.S. Application Data

(63) Continuation of application No. PCT/JP03/13355, filed on Oct. 20, 2003.

(30) Foreign Application Priority Data
Oct. 21, 2002 (JP) .............................. 2002-306271

(51) Int. Cl.
G06F 17/50 (2006.01)
H03D 13/00 (2006.01)
H03D 19/00 (2006.01)
G03R 19/00 (2006.01)

(52) U.S. Cl. .............................. 327/52; 716/6; 327/40; 327/62

(58) Field of Classification Search .................. 327/40, 327/52, 62; 716/6
See application file for complete search history.

(56) References Cited

U.S. PATENT DOCUMENTS

| | | | | |
|---|---|---|---|---|
| 4,859,880 A | * | 8/1989 | Chung et al. | 326/86 |
| 5,229,731 A | * | 7/1993 | Yamamoto | 330/296 |
| 5,495,186 A | * | 2/1996 | Kanazawa et al. | 326/83 |
| 5,606,268 A | * | 2/1997 | Van Brunt | 326/68 |
| 5,666,354 A | * | 9/1997 | Cecchi et al. | 370/284 |
| 5,818,081 A | * | 10/1998 | Ohmi et al. | 257/319 |
| 5,892,717 A | * | 4/1999 | Malarsie | 365/189.06 |
| 6,025,742 A | * | 2/2000 | Chan | 327/108 |
| 6,100,713 A | * | 8/2000 | Kalb et al. | 326/30 |
| 6,437,614 B1 | * | 8/2002 | Chen | 327/143 |
| 6,714,039 B2 | * | 3/2004 | Salcido et al. | 326/30 |

(Continued)

FOREIGN PATENT DOCUMENTS

GB      2342824 A   *   4/2000

(Continued)

OTHER PUBLICATIONS

Patent Abstracts of Japan, Publication No. 2002-170928, Publication Date: Jun. 14, 2002, 1 page.

(Continued)

*Primary Examiner*—Stacy A Whitmore
(74) *Attorney, Agent, or Firm*—Osha • Liang LLP (57) ABSTRACT

A transmission circuit, which transmits a differential signal having pulse time larger than a predetermined minimum pulse time, includes: a driving unit for feeding the differential signal as a potential difference between two transmission lines; a driven unit for operating on the basis of the differential signal by receiving the differential signal by the potential difference between the two transmission lines; and a connecting resistor for electrically connecting the two transmission lines. Further, a connecting MOS transistor may be provided near a receiving end of the driven unit.

3 Claims, 4 Drawing Sheets

U.S. PATENT DOCUMENTS

| | | | |
|---|---|---|---|
| 6,894,536 B2 * | 5/2005 | Martin et al. | 326/63 |
| 2002/0033711 A1 * | 3/2002 | Mack | 326/29 |
| 2002/0109549 A1 * | 8/2002 | Numanami et al. | 330/277 |
| 2002/0135402 A1 * | 9/2002 | Miyabe et al. | 327/94 |
| 2002/0149397 A1 * | 10/2002 | Dally et al. | 327/51 |
| 2002/0167333 A1 * | 11/2002 | Usui | 326/86 |
| 2002/0175739 A1 * | 11/2002 | Sidiropoulos et al. | 327/345 |
| 2003/0137352 A1 * | 7/2003 | Youn et al. | 330/277 |
| 2005/0239431 A1 * | 10/2005 | Yamamoto | 455/33 |

FOREIGN PATENT DOCUMENTS

| | | |
|---|---|---|
| JP | 51-114882 | 10/1976 |
| JP | 52-034683 | 3/1977 |
| JP | 06-216751 | 8/1994 |
| JP | 09-293094 | 11/1997 |
| JP | 2002-170928 | 6/2002 |
| JP | 2002-313916 | 10/2002 |
| JP | 2003-224462 | 8/2003 |

OTHER PUBLICATIONS

Patent Abstracts of Japan, Publication No. 06-216751, Publication Date: Aug. 5, 1994, 1 page.

Patent Abstracts of Japan, Publication No. 2003-224462, Publication Date: Aug. 8, 2003, 1 page.

Patent Abstracts of Japan, Publication No. 51-114882, Publication Date: Oct. 8, 1976, 1 page.

Patent Abstracts of Japan, Publication No. 52-034683, Publication Date: Mar. 16, 1977, 1 page.

Patent Abstracts of Japan, Publication No. 2002-313916, Publication Date: Oct. 25, 2002, 1 page.

Patent Abstracts of Japan, Publication No. 09-293094, Publication Date: Nov. 11, 1997, 1 page.

International Search Report for International Application No. PCT/JP03/13355 mailed on Jan. 27, 2004, 3 pages.

* cited by examiner

TRANSMISSION CIRCUIT, CMOS SEMICONDUCTOR DEVICE, AND DESIGN METHOD THEREOF

The present application is a continuation application of PCT/JP03/13355 filed on Oct. 20, 2003, claiming priority from a Japanese Patent application No. 2002-306271 filed on Oct. 21, 2002, the contents of which are incorporated herein by reference.

BACKGROUND OF THE INVENTION

1. Field of the Invention

The present invention relates to a transmission circuit, a CMOS semiconductor device, and a design method thereof. More particularly, the present invention relates to a transmission circuit for transmitting a differential signal having pulse time larger than a predetermined minimum pulse time.

2. Description of Related Art

Conventionally, a transmission circuit of a CMOS semiconductor device for transmitting a signal is known. The constitution of the transmission circuit is disclosed in, for example, Japanese Patent Application Laid-Open No. 1999-146021. Further, a transmission circuit having a plurality of repeaters for relaying clock signals is known.

However, a transmission line connecting two repeaters has wiring resistance and the repeater has input impedance based on capacitance of a gate input. Thus, for example, in case of transmitting a high-speed clock signal, sometimes the signal cannot be properly transmitted due to a wiring delay of the transmission line.

Accordingly, it is an object of the present invention to provide a transmission circuit, a CMOS semiconductor device, and a design method thereof which are capable of overcoming the above drawbacks accompanying the conventional art. The above object can be achieved by combinations described in the independent claims. The dependent claims define further advantageous and exemplary combinations of the present invention.

SUMMARY OF THE INVENTION

In order to solve the problems above, according to the first aspect of the present invention, a transmission circuit, which transmits a differential signal having pulse time larger than a predetermined minimum pulse time, includes: a driving unit for feeding the differential signal as a potential difference between two transmission lines; a driven unit for operating on the basis of the differential signal by receiving the differential signal by the potential difference between the two transmission lines; and a connecting MOS transistor for electrically connecting the two transmission lines by receiving a predetermined voltage through its gate terminal, each of its source terminal and drain terminal being electrically connected with one of the two transmission lines.

Further, the connecting MOS transistor may be provided near a receiving end of the driven unit. The transmission lines of a semiconductor device may be formed of a group of metal layers of substantially uniform thickness and electrically insulated from other conductive layers of the semiconductor device by a group of interlayer films of substantially uniform thickness. The gate terminal may receive a gate voltage making the connecting MOS transistor operate within a linear region as the predetermined voltage from a steady power supply.

Further, at least more than two connecting MOS transistors maybe included, one of the connecting MOS transistors may be an NMOS transistor, and another be a PMOS transistor connected with the NMOS transistor in series or in parallel.

Further, the driving unit may include two driving unit NMOS transistors each of which is provided to correspond to each of the two transmission lines and outputs a drain voltage to the corresponding transmission line, and the driven unit may include two driven unit NMOS transistors each of which is provided to correspond to each of the two transmission lines and receives potential of the corresponding transmission line through its gate terminal. The driving unit NMOS transistor may output a drain voltage according to an input received through its gate terminal from the outside of the driving unit, and the driven unit NMOS transistor may output a drain voltage to the outside of the driven unit according to potential of the transmission line received through its gate terminal.

According to the second aspect of the present invention, a transmission circuit, which transmits a differential signal having pulse time larger than a predetermined minimum pulse time, includes: a driving unit for feeding the differential signal as a potential difference between two transmission lines; a driven unit for operating on the basis of the differential signal by receiving the differential signal by the potential difference between the two transmission lines; and a connecting resistor which has impedance substantially equal to or less than the sum of impedance of each of the two transmission lines and electrically connects the two transmission lines. The connecting resistor may be provided near a receiving end of the driven unit.

According to the third aspect of the present invention, a transmission circuit, which transmits a differential signal having pulse time larger than a predetermined minimum pulse time, includes: a driving unit for feeding the differential signal as a potential difference between two transmission lines; and a driven unit for receiving the differential signal by the potential difference between the two transmission lines and operating on the basis of the differential signal; wherein the driving unit includes two driving unit NMOS transistors each of which is provided to correspond to each of the two transmission lines and outputs a drain voltage to the corresponding transmission line, and the driven unit includes two driven unit NMOS transistors each of which is provided to correspond to each of the two transmission lines and receives potential of the corresponding transmission line through its gate terminal.

According to the fourth aspect of the present invention, a CMOS semiconductor device, which operates according to a clock signal received from the outside, includes: a transmission circuit for transmitting the clock signal; and a processing unit for receiving the clock signal from the transmission circuit and processing data received from the outside synchronously with the clock signal, wherein the transmission circuit includes a driving unit for feeding the clock signal as a potential difference between two transmission lines; a driven unit for operating on the basis of the clock signal by receiving the clock signal by the potential difference between the two transmission lines; and a connecting MOS transistor for electrically connecting the two transmission lines by receiving a predetermined voltage through its gate terminal, each of its source terminal and drain terminal being electrically connected with one of the two transmission lines.

Further, the transmission lines of a semiconductor device may be formed of a group of metal layers of substantially uniform thickness and electrically insulated from other conductive layers of the semiconductor device by a group of interlayer films of substantially uniform thickness.

According to the fifth aspect of the present invention, a CMOS semiconductor device, which operates according to a clock signal received from the outside, includes: a transmission circuit for transmitting the clock signal; and a processing unit for receiving the clock signal from the transmission circuit and processing data received from the outside synchronously with the clock signal, wherein the transmission circuit includes a driving unit for feeding the clock signal as a potential difference between two transmission lines; a driven unit for operating on the basis of the clock signal by receiving the clock signal by the potential difference between the two transmission lines; and a connecting resistor which has impedance substantially equal to or less than the sum of impedance of each of the two transmission lines and electrically connects the two transmission lines.

According to the sixth aspect of the present invention, a CMOS semiconductor device, which operates according to a clock signal received from the outside, includes: a transmission circuit for transmitting the clock signal; and a processing unit for receiving the clock signal from the transmission circuit and processing data received from the outside synchronously with the clock signal, wherein the transmission circuit includes a driving unit for feeding the clock signal as a potential difference between two transmission lines; and a driven unit for operating on the basis of the clock signal by receiving the clock signal by the potential difference between the two transmission lines, the driving unit includes two driving unit NMOS transistors each of which is provided to correspond to each of the two transmission lines and outputs a drain voltage to the corresponding transmission line, and the driven unit includes two driven unit NMOS transistors each of which is provided to correspond to each of the two transmission lines and receives potential of the corresponding transmission line through its gate terminal.

According to the seventh aspect of the present invention, a design method for designing a transmission circuit including a plurality of relay buffers for relaying a transmission signal having pulse time larger than a predetermined minimum pulse time and a plurality of transmission lines each of which transmits the transmission signal between two of the relay buffers by electrically connecting the two relay buffers, includes: a no-load delay time acquiring step of acquiring a no-load delay time, which is a delay time generated in an output in case the output is not connected to a load, for one of the relay buffers; a capacitance-resistance acquiring step of acquiring the upper limit of the product of wiring capacitance and wiring resistance which is allowable for one of the transmission lines on the basis of the product of output impedance and input impedance of the relay buffer, the no-load delay time, and the minimum pulse time; a wiring length acquiring step of acquiring the upper limit of wiring length of the transmission line on the basis of the upper limit of the product of wiring capacitance and wiring resistance; a wiring width setting step of setting wiring width of the transmission line; and a disposing step of determining the number of the plurality of relay buffers and disposition of each of the relay buffers so that wiring length of each of the transmission lines is less than the upper limit of wiring length.

Further, the relay buffer may relay the transmission signal as a differential signal based on a potential difference between two of the transmission lines, and the upper limit of the product of wiring capacitance and wiring resistance may be acquired on the basis of the input impedance of the relay buffer corresponding to the two transmission lines in the capacitance-resistance acquiring step.

Further, the upper limit of the product of wiring capacitance and wiring resistance may be acquired on the basis of an delay time of the transmission line allowable in response to the minimum pulse time under a condition that the ratio of the output impedance to the input impedance of the relay buffer is substantially the same as the ratio of the wiring resistance to the wiring capacitance, in the capacitance-resistance acquiring step.

Further, the transmission lines of a semiconductor device may be formed of a group of metal layers of substantially uniform thickness and electrically insulated from other conductive layers of the semiconductor device by a group of interlayer films of substantially uniform thickness.

Further, the upper limit of the product of wiring capacitance and wiring resistance of the transmission line may be acquired under a condition that the product varies on the basis of the wiring length of the transmission line and is substantially constant regardless of the wiring width of the transmission line in case the wiring length is fixed, in the capacitance-resistance acquiring step.

Further, the design method further includes a buffer size determining step of determining the size of the relay buffer on the basis of the upper limits of the wiring width and the wiring length, and, in the disposing step, the number and disposition of the relay buffers of which size may be determined in the size determining step. Further, the design method further includes a buffer size determining step of determining the size of the relay buffer, and, in the wiring width setting step, the wiring width may be set on the basis of the size of the relay buffer and the upper limit of the wiring length.

The summary of the invention does not necessarily describe all necessary features of the present invention. The present invention may also be a sub-combination of the features described above.

BRIEF DESCRIPTION OF THE DRAWINGS

FIG. 2A shows an example of the circuit configuration of the transmission circuit 100.

FIG. 2B describes a distribution constant of a normal signal transmission line 106.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
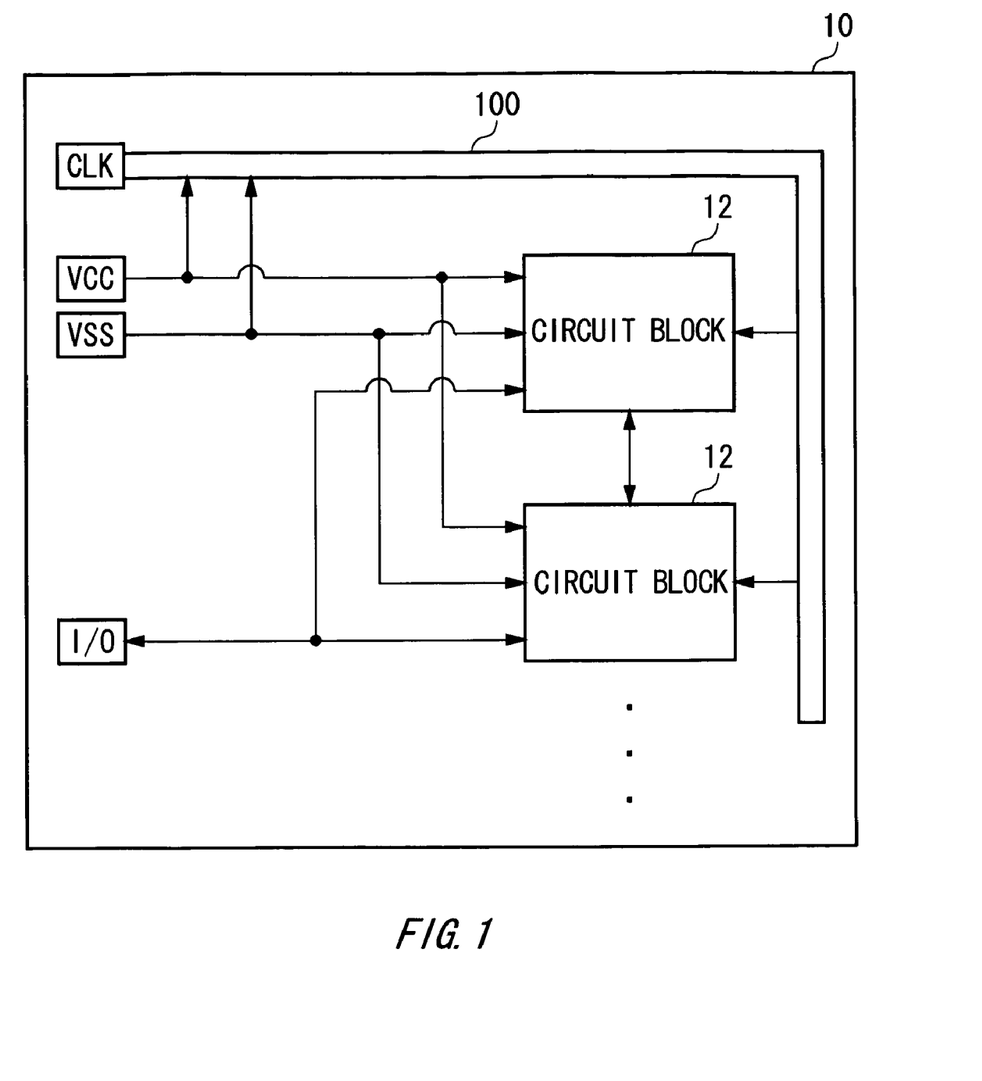
FIG. 1 shows an example of the configuration of a CMOS semiconductor device 10.

FIG. 1 shows an example of the configuration of a CMOS semiconductor device 10 according to an embodiment of the present invention. The CMOS semiconductor device 10 receives an operation voltage through a power supply voltage terminal (VCC) and a ground terminal (VSS) and operates according to a clock signal received through a clock terminal (CLK) from the outside. According to the present example, the CMOS semiconductor device 10 includes a transmission circuit 100 and a plurality of circuit blocks 12.

The transmission circuit 100 transmits a clock signal having pulse time larger than a predetermined minimum pulse time inside the CMOS semiconductor device 10. The transmission circuit 100 receives the clock signal through the clock terminal (CLK) from the outside of the CMOS semiconductor device 10 and provides the plurality of circuit blocks with the clock signal. Further, according to the present example, the transmission circuit 100 transmits the clock signal by a differential signal based on the potential difference between two transmission lines.

The circuit blocks 12 process data received through an input/output terminal (I/O) from the outside of the CMOS semiconductor device 10 synchronously with the clock signal. Further, the circuit blocks 12 output the process result to the output of the CMOS semiconductor device 10 through the input/output terminal.

FIG. 2A shows an example of the circuit configuration of the transmission circuit 100. The transmission circuit 100 according to the present example can reduce delay amount of the clock signal. The transmission circuit 100 includes a plurality of normal signal transmission lines 106, a plurality of inverted signal transmission lines 108, a plurality of buffer circuits 102a and 102b, and a plurality of resistors 104. Further, the transmission circuit 100 includes much more buffer circuits 102 (not shown) connected with each other in series by the normal signal transmission lines 106 and the inverted signal transmission lines 108.

The normal signal transmission line 106 and the inverted signal transmission line 108 electrically connect two buffer circuits 102 and thus transmit the clock signal, which is a differential signal. The normal signal transmission line 106 transmits a normal signal of the clock signal and the inverted signal transmission line 108 transmits an inverted signal of the clock signal.

The normal signal transmission line 106 and the inverted signal transmission line 108 for the CMOS semiconductor device 10 (see FIG. 1) are formed of a group of metal layers of substantially uniform thickness. Further, the normal signal transmission line 106 and the inverted signal transmission line 108 are electrically insulated from other conductive layers of the CMOS semiconductor device 10 by a group of interlayer films of substantially uniform thickness.

Thus, the normal signal transmission line 106 and the inverted signal transmission line 108 have impedance based on wiring resistance and wiring capacitance, which are based on a predetermined distribution constant. According to the present example, the normal signal transmission line 106 and the inverted signal transmission line 108 have wiring resistance based on a distribution constant substantially inversely proportional to a wiring width and wiring capacitance based on a distribution constant substantially proportional to the wiring width. Further, the normal signal transmission line 106 and the inverted signal transmission line 108 may have substantially equal impedances.

Each of the buffer circuits 102 has a function of repeater and relays the clock signal. Further, each of the buffer circuits 102 is designed on the basis of a design parameter equal to that of other buffer circuit, for example, and thus, has the same or similar function. Further, the buffer circuits 102a and 102b are an example of two continuous buffer circuits 102.

The buffer circuit 102a is electrically connected with each of the buffer circuit 102b and a pre-stage buffer circuit 102 via the normal signal transmission line 106 and the inverted signal transmission line 108. The buffer circuit 102a feeds the clock signal received from the pre-stage buffer circuit 102 to the buffer circuit 102b as the potential difference between the normal signal transmission line 106 and the inverted signal transmission line 108, and thus transmits the clock signal to the buffer circuit 102b.

In addition, the buffer circuit 102a has input impedance ct based on capacitance of a gate input between the normal signal transmission line 106 and the inverted signal transmission line 108 of its input side. Further, the buffer circuit 102a has output impedance rt for each of the normal signal transmission line 106 and the inverted signal transmission line 108 of its output side.

The buffer circuit 102b receives the clock signal from the buffer circuit 102a by the potential difference between the normal signal transmission line 106 and the inverted signal transmission line 108. Then, on the basis of the received clock signal, the buffer circuit 102b transmits the clock signal to the post-stage buffer circuit 102.

The resistor 104 is provided to correspond to each buffer circuit 102 and electrically connects the normal signal transmission line 106 and the inverted signal transmission line 108 near a receiving end of the corresponding buffer circuit 102. Thus, the resistor 104 reduces a resistance component of the impedances of the normal signal transmission line 106 and the inverted signal transmission line 108 viewed from the input of the buffer circuit 102b. Thus, according to the present example, the resistor 104 reduces a time constant required to charge or discharge the capacitance of the input of the buffer circuit 102. Further, thus, it is possible to reduce the delay amount of the clock signal of the normal signal transmission line 106 and the inverted signal transmission line 108. In addition, it is preferable that the resistor 104 has impedance which is substantially the same as or smaller than the sum of the impedance of the normal signal transmission line 106, the impedance of the inverted signal transmission line 108, and the output impedance of the buffer circuit 102a. Further, the resistor 104 may reduce reflection of the clock signal at the receiving end of the buffer circuit 102.

FIG. 2B describes the distribution constant of the normal signal transmission line 106. Recently, while it is progressed to make a semiconductor minute and a speed transistor is realized, an influence of wiring elements to the operation speed increases. Since pulse time of a semiconductor device operating at high speed is extremely short, wiring between repeaters also shows an electrical characteristic which is a distribution constant. According to the present example, a wiring length of the normal signal transmission line 106 is L, and the normal signal transmission line 106 has resistance $R_L$ per a unit length and electrostatic capacitance $C_L$ per the unit length. Thus, the normal signal transmission line 106 has wiring resistance of $R=R_L L$ and wiring capacitance of $C=C_L L$. Further, the inverted signal transmission line 108 has wiring resistance R and wiring capacitance L as same as those of the normal signal transmission line 106.

Here, in order to perform the transmission at high speed, it is required to charge the wiring capacitance C and the capacitance ct of the input unit of the buffer circuit 102b, which is a repeater, with electric charge in a short time. This time is in proportion to the product of the wiring capacitance C and the wiring resistance R viewed from the wiring capacitance C, that is, an RC product. Here, if the capacitance ct of the input unit is made constant in order to secure driving ability of the repeater, it is preferable to reduce a resistance component of the transmission line viewed from the wiring capacitance C in order to perform the transmission at high speed.

Here, in case of increasing the wiring width of the transmission line in order to reduce the resistance component, the time taken to charge the wiring capacitance C increases even if it is possible to charge the input capacitance ct of the repeater in a short time because the wiring capacitance C increases. However, according to the present example, it is possible to perform the transmission at high speed by electrically connecting the normal signal transmission line 106 and the inverted signal transmission line 108 via the resistor 104 without increasing the wiring width of the transmission line.

Further, since the wiring resistance between the buffer circuit 102b and the resistor 104 is connected with the resistor 104 in series with respect to the input capacitance ct, a resistance component due to the wiring resistance is not reduced even if the resistor 104 is provided. However, according to the present example, according to the present example, the resistor 104 is provided near the buffer circuit 102b. Thus, according to the present example, it is possible to perform transmission at properly high speed.

Here, since the amplitude of a transmitted signal is extremely reduced in case a value of the resistance of the resistor 104 is small, sometimes the buffer circuit 102 of the receiving side cannot correctly receive the clock signal. Thus, it is preferable that the resistor 104 has a resistance value making a period of the buffer circuit 12 detecting the clock signal and the amplitude of the clock signal maintain magnitude which can be detected by the buffer circuit 102.

Figure 2:
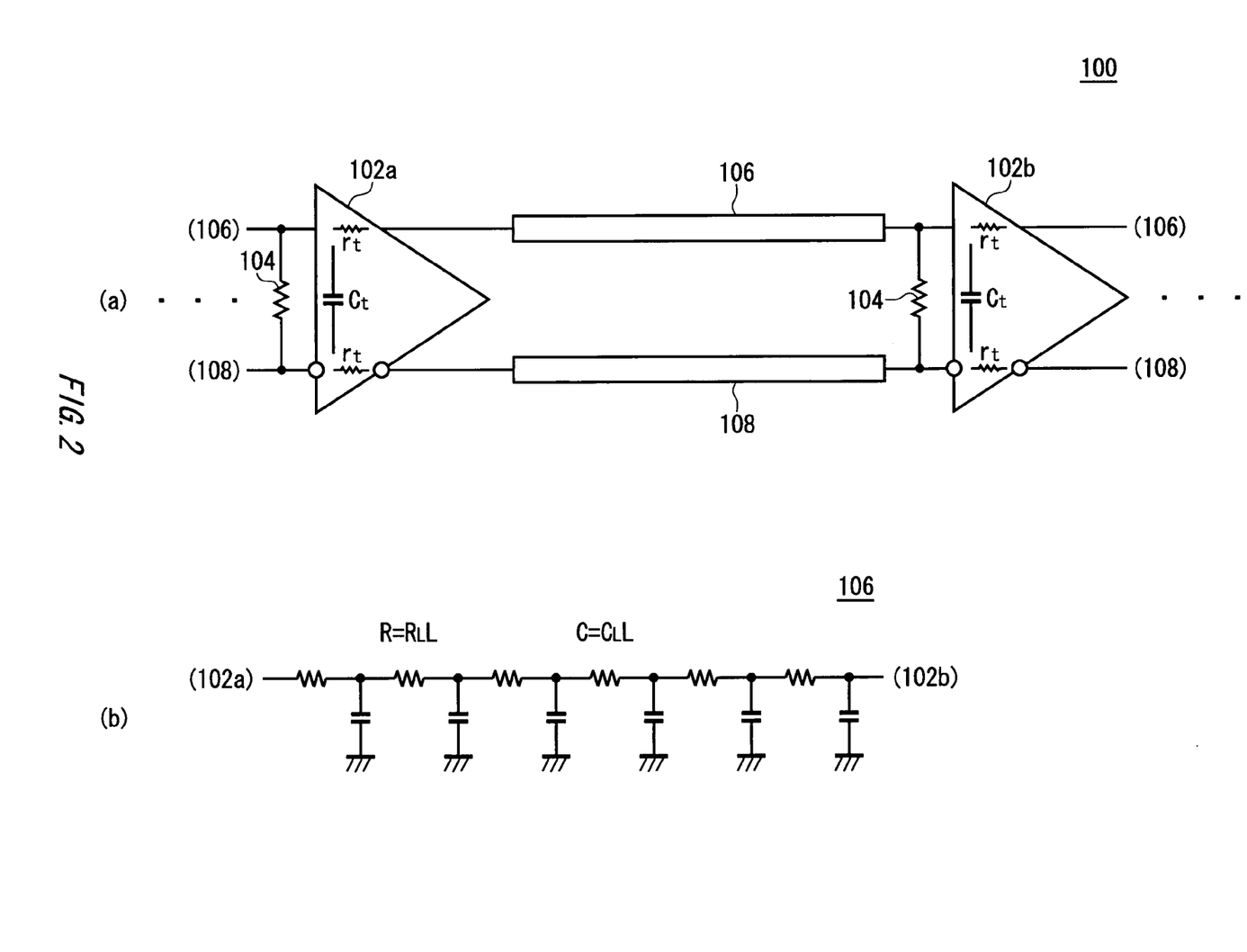
FIG. 2 shows an example of the circuit configuration of a transmission circuit 100.
Figure 3:
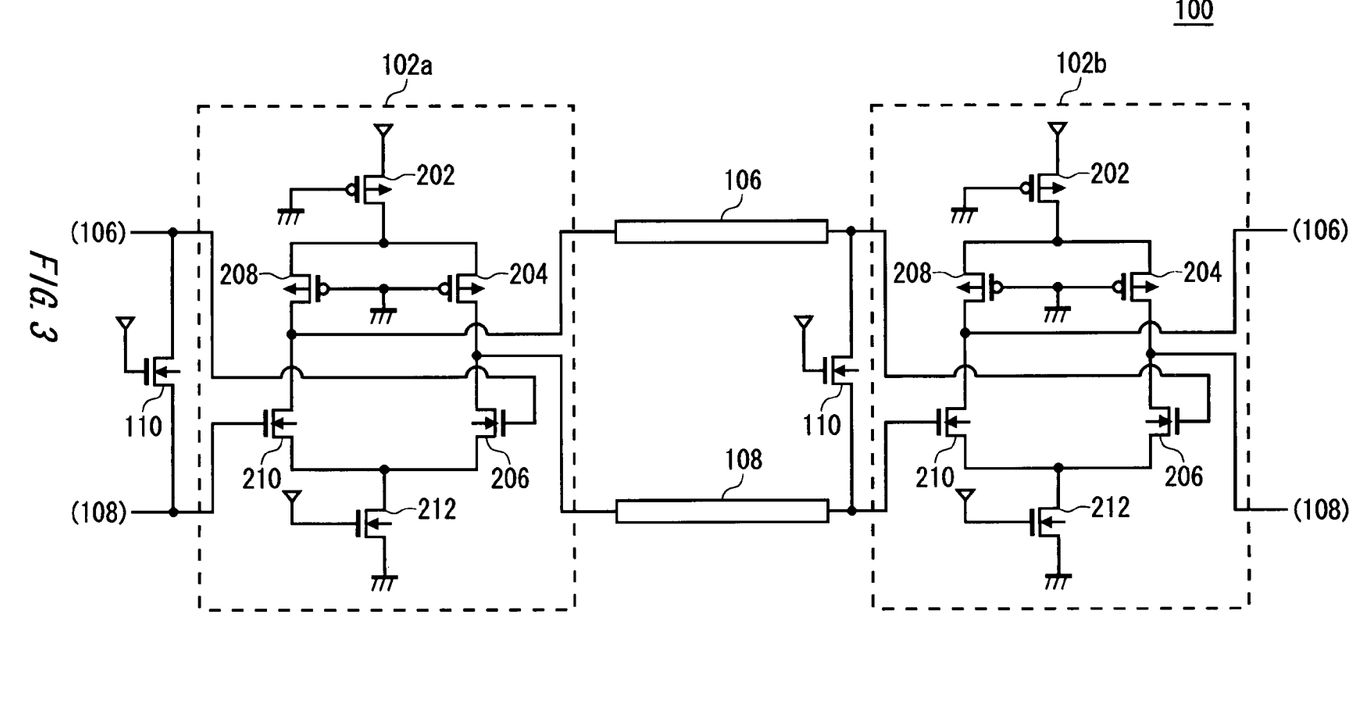
FIG. 3 shows an example of the circuit configuration of the transmission circuit 100 in detail.

FIG. 3 shows an example of the circuit configuration of the transmission circuit 100 in detail. According to the present example, the transmission circuit 100 includes an NMOS transistor 110 as the resistor 104 (see FIG. 2). The NMOS transistor 110 has a source terminal and a drain terminal, which are electrically connected with the normal signal transmission line 106 and the inverted signal transmission line 108, respectively, and electrically connects the normal signal transmission line 106 and the inverted signal transmission line 108 by receiving a predetermined voltage such as a power supply voltage through its gate source.

Thus, the NMOS transistor 110 has a function equal to or similar with that of resistor 104 (see FIG. 2). Here, it is preferable that the gate terminal of the NMOS transistor 110 receives a gate voltage which makes the NMOS transistor 110 operate within a linear region from a steady power supply. Further, preferably, the NMOS transistor 110 is provided near the receiving end of the buffer circuit 102b.

In addition, the transmission circuit 100 may include a PMOS transistor instead of the NMOS transistor 110. Further, the transmission circuit 100 includes one or more NMOS transistor(s) and one or more PMOS transistor(s) instead of the NMOS transistor 110. In this case, these NMOS transistors and PMOS transistors may be connected in series or in parallel. In this case, it is possible to connect the normal signal transmission line 106 and the inverted signal transmission line 108 by a resistance value of a desirable size according to the kind of the MOS transistor and the number of series or parallel connections.

Further, the buffer circuit 102a includes a plurality of NMOS transistors 206, 210, and 212, and a plurality of PMOS transistors 202, 204, and 208. Two NMOS transistors 206 and 210 are provided to correspond to the normal signal transmission line 106 and the inverted signal transmission line 108 which are two transmission lines, respectively, and each of them outputs a drain voltage to the corresponding transmission line.

Here, a gate terminal of the NMOS transistor 210 receives an inverted signal of the clock signal from the pre-stage buffer circuit through the inverted signal transmission line 108. Then, the NMOS transistor 210 provides the buffer circuit 102b with the drain voltage as a normal signal of the clock signal according to the received inverted signal through the normal signal transmission line 106.

Further, the gate terminal of the NMOS transistor 206 receives a normal signal of the clock signal from the pre-stage buffer circuit through the normal signal transmission line 106. Then, the NMOS transistor 206 provides the buffer circuit 102b with the drain voltage as an inverted signal of the clock signal according to the received normal signal through the inverted signal transmission line 108. Thus, the buffer circuit 102a transmits the clock signal received from the pre-stage buffer circuit to the buffer circuit 102b.

The PMOS transistor 204 is connected to the drain side of the NMOS transistor 206 in series. Further, the PMOS transistor 208 is connected to the drain side of the NMOS transistor 210 in series. Each of the PMOS transistors 204 and 208 has a function of resistor and generates an output voltage according to a current amount. According to the present example, gate terminals of the PMOS transistors 204 and 208 are grounded.

The PMOS transistor 202 and the NMOS transistor 212 limit the amount of a current flowing through the buffer circuit 102a. A source terminal of the PMOS transistor 202 receives the power supply voltage and a source voltage of the NMOS transistor 212 is grounded.

Since the buffer circuit 102b has a function equal to or similar with that of the buffer circuit 1021, description on the buffer circuit 102b is omitted. According to the present example, a gate terminal of the NMOS transistor 206 included in the buffer circuit 102b receives the drain voltage of the NMOS transistor 210 included in the buffer circuit 102a through the normal signal transmission line 106. Further, a gate terminal of the NMOS transistor 210 included in the buffer circuit 102b receives the drain voltage of the NMOS transistor 206 included in the buffer circuit 102a through the inverted signal transmission line 108.

Here, for example, in case a gate terminal of the PMOS transistor of the buffer circuit 102b receives the clock signal, man-hour for design increases because the circuit configuration of the buffer circuit 102b is different from that of the buffer circuit 102a. However, according to the present example, since the buffer circuits 102a and 102b have the same or similar configuration, it is possible to reduce man-hour for design.

Figure 4:
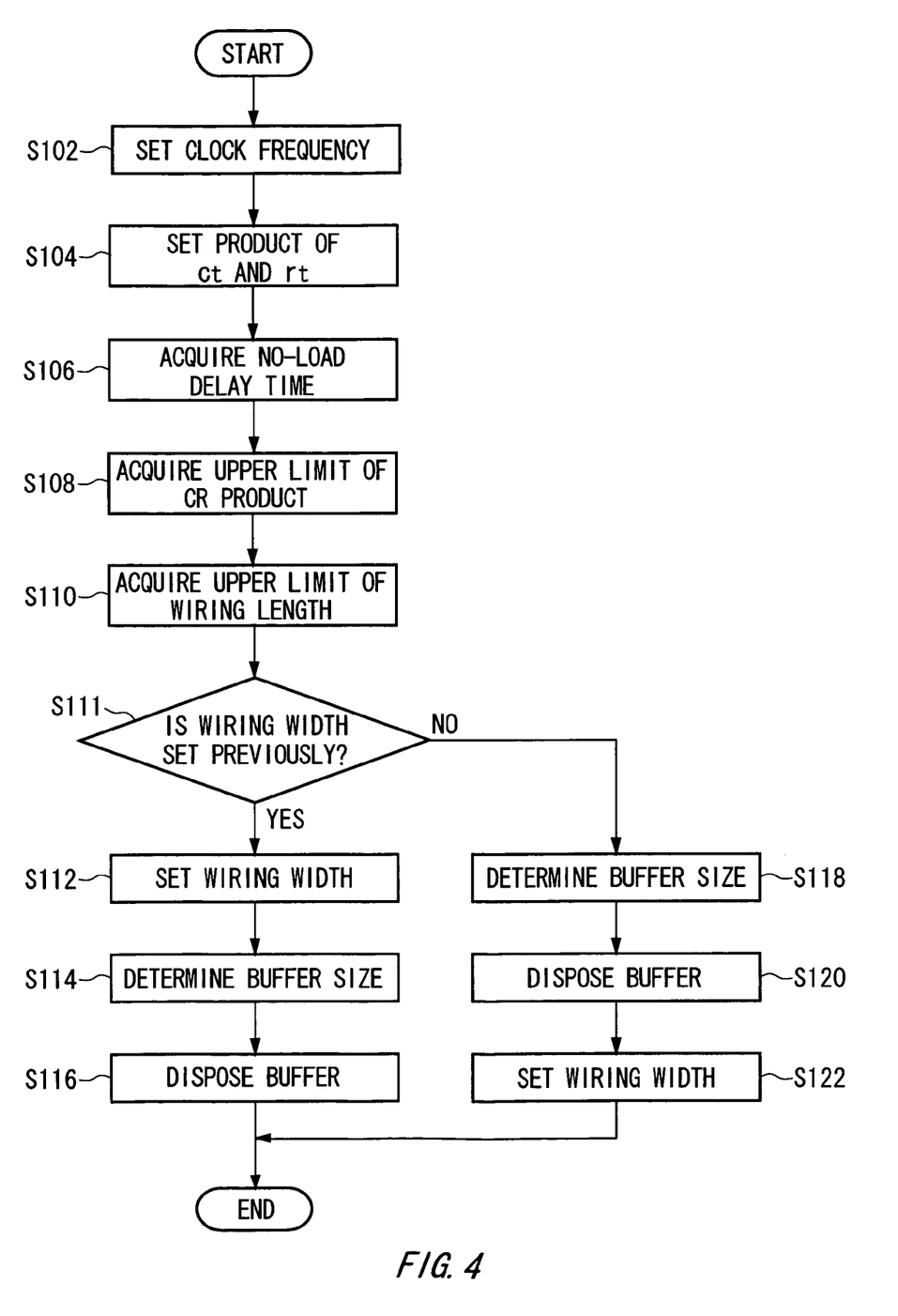
FIG. 4 is a flow chart showing an example of a design method for designing the transmission circuit 100.

FIG. 4 is a flow chart showing an example of a design method for designing the transmission circuit 100. The transmission circuit 100 according to the present example is, for example, the transmission circuit 100 described with respect to FIG. 2 and includes a plurality of buffer circuits 102, a plurality of normal signal transmission lines 106, and a plurality of inverted signal transmission lines 108. The design method according to the present example acquires wiring width and buffer size to make an interval between the buffer circuits 102 used as repeaters the longest.

According to the design method of the present example, first, the frequency of a clock signal is set, for example, on the basis of design specifications and thus the minimum pulse time of the clock signal is set (S102). Then, the kind of a buffer used as the buffer circuit 102 (hereinafter, referred to "basic buffer") is determined and thus the product of an output impedance rt and an input impedance ct of the buffer circuit 102 is set (S104). In S104, the kind of the basic buffer is determined to be a buffer having a function equal to or similar with that of the buffer circuit 102a described with respect to FIG. 3.

In addition, according to the present example, each buffer circuit 102 includes one basic buffer or a plurality of basic buffers connected in parallel, instead of the configuration described with respect to FIG. 3. Thus, the size of the buffer circuit 102 corresponds to the number of the parallel connections of the basic buffers. In this case, it is possible to vary the output impedance rt and the input impedance ct of the buffer circuit 102 by varying the number of the parallel connections of the basic buffers of the buffer circuit 102.

Thus, the buffer circuit 102 has the output impedance rt and the input impedance ct according to its size. Here, the output impedance rt decreases in substantially reverse proportion to the size of the buffer circuit 102 and the input impedance ct increases substantially in proportion to the size of the buffer circuit 102. Thus, according to the present example, the product of the output impedance rt and the input impedance ct is substantially constant regardless of the size of the buffer circuit 102.

Next to S104, no-load delay time, which is delay time generated in an output in case the output is not connected to a load, is acquired for one buffer circuit 102 (S106). Then, on the basis of the no-load delay time, the output impedance rt, the input impedance ct, and the minimum pulse time of the clock signal, the upper limit of the product of wiring capacitance and wiring resistance allowable for each of the normal signal transmission line 106 and the inverted signal transmission line 108 (hereinafter, referred to "CR product) is acquired (S108).

Then, the upper limit of wiring length of the transmission line is acquired on the basis of the upper limit of the CR product (S110). In case wiring width is previously set (S111), the wiring width of one transmission line is set, for example, on the basis of the design specification (S112).

Here, according to the present example, the transmission line of a semiconductor device is formed of a group of metal layers of substantially uniform thickness and is electrically insulated from other conductive layers of the semiconductor device by interlayer films of substantially uniform thickness. Thus, in S110, the CR product of the transmission line is varied on the basis of the wiring length of the transmission line and the upper limit of the CR product may be acquired under a condition that the CR product is substantially constant regardless of the wiring width of the transmission line in case the wiring length is fixed.

Then, on the basis of the wiring width set in S112 and the upper limit of the wiring length acquired in S110, the size of the buffer circuit 102 is determined (S114). In this case, the size of the buffer circuit 102 is determined, for example, by determining the number of the parallel connections of the basic buffers of the buffer circuit 102. Then, the number of the plurality of buffer circuits 102 of the transmission circuit 100 and disposition of each buffer circuit 102 are determined so that the wiring length of each of the transmission lines is less than the upper limit of the wiring length (S116).

In the meantime, in case the size of the buffer circuit 102 is determined prior to the wiring width (S111), the size of the buffer circuit 102 is determined next to S111 (S118), and the number of the plurality of buffer circuits 102 of the transmission circuit 100 and disposition of each buffer circuit 102 are determined so that the wiring length of each of the transmission lines is less than the upper limit of the wiring length (S120).

Then, the wiring width of one transmission line on the basis of the size of the buffer circuit 102 set in S118 and the upper limit of the wiring length acquired in S110 (S122). In addition, according to another example, the disposition of the buffer circuit 102 may be determined after the wiring width is set.

In addition, according to the design method of the present example, the resistor 104 (see FIG. 2) is disposed, for example, after the disposition of the buffer circuit 102 is determined in S116. According to another example, in S106, the upper limit of the CR product may be acquired on the basis of impedance generated by synthesizing the resistance value of the resistor 104 and the input impedance ct, instead of the input impedance ct.

The operation in S108 will be further described in detail hereinafter. Equation 1 shows a voltage of the input end of the buffer circuit 102 at a time t on the basis of the telegraphic equation. According to the present example, the voltage of the input end is a potential difference between the normal signal transmission line 106 and the inverted signal transmission line 108.

$$V_{(t)} = E_0 - \sum \frac{E_0 \exp\left(-\frac{\lambda_n^2}{CR}t^n\right)}{2(1-\sigma\lambda_n^2)\left(\frac{1}{\sin\lambda_n} - \frac{\cos\lambda_n}{\lambda_n}\right) + 1} \quad \text{(Equation 1)}$$

$$(n = 1, 2, 3 \ldots)$$

Here, $E_o$ is the output voltage of the pre-stage buffer circuit 102, C and R are the wiring capacitance and the wiring resistance based on the distribution constant of the normal signal transmission line 106, respectively. $\lambda_n$ is an n-th smallest positive real number satisfying Equations 2 to 4 based on the telegraphic equation. The time t is the time elapsed after the pre-stage buffer circuit 102 outputs the voltage $E_o$. Further, the inverted signal transmission line 108 has wiring capacitance C and wiring resistance R substantially similar with those of the normal signal transmission line 106.

$$\tan\lambda_n = \frac{\frac{1}{\lambda_n} - \sigma\lambda_n}{\kappa} \quad \text{(Equation 2)}$$

$$\kappa = \frac{c_t R + C r_t}{CR} \quad \text{(Equation 3)}$$

$$\sigma = \frac{c_t r_t}{CR} \quad \text{(Equation 4)}$$

In this case, the voltage of the input end of the buffer circuit 102 varies according to the sum of functions each of which time constant shows five (5) ($T_1, T_2, \ldots$). Here, according to the present example, at the time t of a state where the input end of the buffer circuit 102 is settled, terms of $n \geq 2$ of the series expansion of Equation 1 are exponentially small and Equation 1 can be approximate to only the term of n=1. Thus, according to the present example, in S106, the upper limit of the CR product allowable for the normal signal transmission line 106 and the inverted signal transmission line 108 is acquired on the basis of a condition under which $T_1$ becomes the minimum.

$$T_n = \frac{CR}{\lambda_n^2} \quad \text{(Equation 5)}$$

Here, $T_1$ becomes the minimum in case $\lambda_1$ is the maximum by Equation 5 and κ is the maximum by Equations 2 to 4. Further, according to the present example, since each of C and R varies under the condition that the CR product maintains the constant upper limit, κ is the maximum in case Equation 6 is satisfied by Equation 3. That is, in S108, the upper limit of the CR product is acquired under a condition that the ratio of the output impedance rt to the input impedance ct of the buffer circuit 102 is substantially the same as the ratio of the wiring resistance R to the wiring capacitance C. Further, in this case, Equations 2 and 3 become Equations 7 and 8, respectively.

$$c_r R = C r_t \quad \text{(Equation 6)}$$

$$\tan \lambda_n = \frac{\frac{1}{\sqrt{\sigma} \lambda_n} - \sqrt{\sigma} \lambda_n}{2} \quad \text{(Equation 7)}$$

$$\kappa = 2\sqrt{\sigma} \quad \text{(Equation 8)}$$

Here, Equations 4 and 7 become Equations 9 and 10, respectively, because $CR = T_1 \times \lambda_1^2$ from Equation 5 in case $n=1$.

$$\sigma = \frac{c_t r_t}{\lambda_1^2 T_1} \quad \text{(Equation 9)}$$

$$\tan \lambda_1 = \frac{\sqrt{\frac{T_1}{c_t r_t}} - \sqrt{\frac{c_t r_t}{T_1}}}{2} \quad \text{(Equation 10)}$$

In this case, if $\lambda_1$ is eliminated from Equation 10 on the basis of the relationship $CR = T_1 \times \lambda_1^2$, Equation 10 becomes Equation 11. Equation 11 shows the upper limit of the CR product allowable under the time constant $T_1$. According to the present example, the upper limit of the CR product allowable under the time constant corresponding to a time, which is obtained by subtracting the no-load delay time from the minimum pulse time, is acquired according to Equation 11.

$$CR = T_1 \left\{ \tan^{-1} \left( \frac{\sqrt{\frac{T_1}{c_t r_t}} - \sqrt{\frac{c_t r_t}{T_1}}}{2} \right) \right\}^2 \quad \text{(Equation 11)}$$

For example, in case the product of ct and rt is 7.5 ps and a time at which the value of V(t) reaches 99 percent (%) of $E_o$ (99% settling time) is let to be 260 ps in Equation 1, it is needed to let the time constant T1 be substantially 48.0 ps. In addition, the time constant T1 is substantially the same as delay time of the transmission line which is allowed in response to the difference of the minimum pulse time of the clock signal and the no-load delay time. In this case, according to Equations 10 and 11, $\tan \lambda_1$ is substantially 1.065 and allowable CR is substantially 32.0 ps. That is, in this case, the upper limit of CR is substantially 32.0 ps.

In addition, in S110, the upper limit of the wiring length of the transmission line is acquired on the basis of the upper limit of the CR product. Then, in S114, on the basis of the upper limit of the wiring length and the wiring width determined in S112, the wiring capacitance C and the wiring resistance R of the transmission line are acquired. Then, on the basis of the values of C and R, the values of ct and rt, which satisfy Equation 6, are acquired and the size of the buffer circuit 102 is determined according to the acquired values. According to the present example, it is possible to make the interval of the buffer circuit 102 the longest. Further, thus, it is possible to design the transmission circuit 100 properly.

In addition, according to another example, the size of the buffer circuit 102 may be determined prior to setting the wiring width and the wiring width may be determined on the basis of the determined size of the buffer circuit 102. In this case, it is also possible to the interval of the buffer circuit 102 the longest.

As obvious from the above description, according to the present invention, it is possible to reduce delay amount of the clock signal.

Although the present invention has been described by way of exemplary embodiments, it should be understood that those skilled in the art might make many changes and substitutions without departing from the spirit and the scope of the present invention, which is defined only by the appended claims.

What is claimed is:

1. A transmission circuit, which transmits a differential signal having pulse time larger than a predetermined minimum pulse time, comprising:
    a plurality of driving units, each of which feeding the differential signal as a potential difference between two transmission lines;
    a plurality of driven units, each of which operating on the basis of the differential signal by receiving the differential signal by the potential difference between the two transmission lines; and
    a plurality of connecting MOS transistors, each of which electrically connecting the two transmission lines by receiving a predetermined voltage through its gate terminal, each of its source terminal and drain terminal being electrically connected with one of the two transmission lines,
    wherein the plurality of driving units, the plurality of driven units, and the plurality of connecting MOS transistors are connected with each other in series via the two transmission lines.

2. A transmission circuit as claimed in claim 1, wherein said each of the connecting MOS transistor is provided near a receiving end of said driven unit.

3. A transmission circuit as claimed in claim 1, wherein the gate terminal receives a gate voltage as the predetermined voltage from a steady power supply, and
    wherein the gate voltage makes said each of the connecting MOS transistor operate within a linear region.

* * * * *